(No Model.)
J. D. PAGE.
BALING PRESS.
No. 295,672. Patented Mar. 25, 1884.
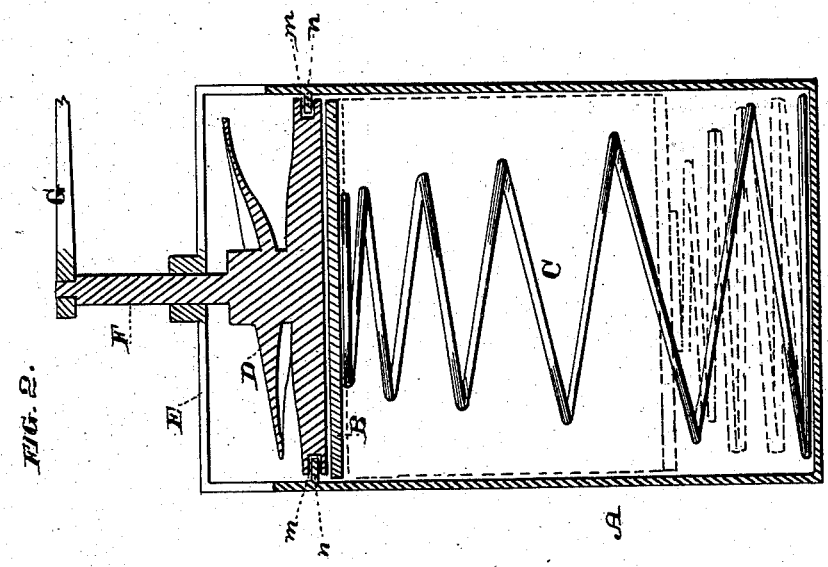
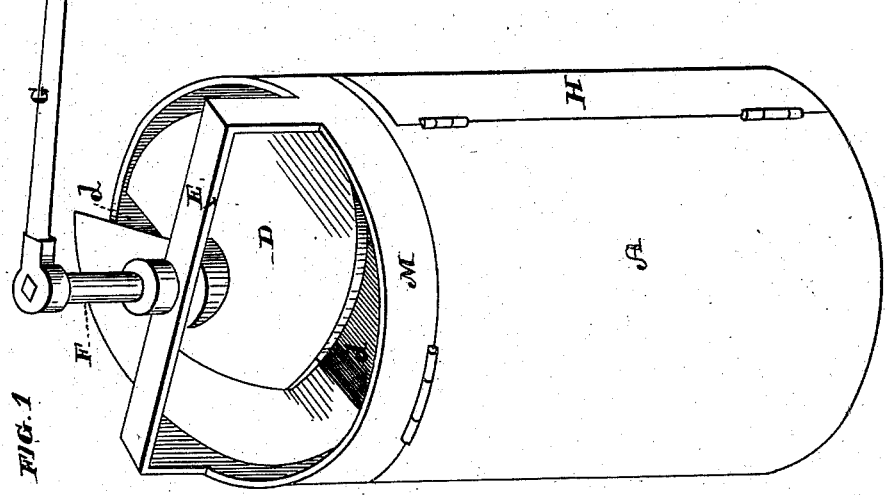
Witnesses,
Geo. H. Strong.
Inventor,
John D. Page
By Dewey & Co.
Attorneys
N. PETERS, Photo-Lithographer, Washington, D. C.

UNITED STATES PATENT OFFICE.

JOHN D. PAGE, OF SANDERS, CALIFORNIA.

BALING-PRESS.

SPECIFICATION forming part of Letters Patent No. 295,672, dated March 25, 1884.

Application filed September 25, 1883. (No model.)

*To all whom it may concern:*

Be it known that I, JOHN D. PAGE, of Sanders, county of Fresno, and State of California, have invented an Improvement in Baling-Presses; and I hereby declare the following to be a full, clear, and exact description thereof.

My invention relates to a new and useful baling-press, and to certain improvements therein, consisting in a peculiar screw-shaped feeder and compressor, and in a guiding-follower against which the feeder constantly presses the material until baled.

The object of my invention is to provide a baling-press in which the material shall be fed to a good advantage and be subjected to pressure throughout the entire operation, whereby a better and firmer bale may be made; and, further, to make an effective and economical device.

Referring to the accompanying drawings, Figure 1 is a perspective view of my press. Fig. 2 is a vertical section of same.

A is the body or chamber of the press, constructed in any suitable manner, and cylindrical in shape, or some modification of this shape suited to the compressor described. Within the chamber is a follower, B, supported upon and influenced by a spiral spring, C, between it and the bottom or end of the chamber.

D is the feeder and compressor. It consists of a short section or portion of a screw, the thread of which is double or multiplex, each thread being formed but for a semi-circumference, one being on one side and one on the other side of the stem or barrel of the screw. I may construct it with a single thread, a single feeding-aperture, or any modification of screw whereby a pressure of the bale can be made continuous with the feeding in of the hay. When the double thread, as illustrated, is used, two apertures, *d*, are formed, opening in opposite directions, and communicating with the interior of the chamber. This feeder is mounted in the top of the chamber in a cross-head, E, by means of a central shaft, F, to which the lever or pole G is secured, by means of which the power is applied to rotate the screw-feeder D. In order to guide this latter, there are grooves *m* cut in a portion of the edges of its threads, which said grooves fit an inwardly-projecting flange, *n*, in the top of the chamber A.

H represents a door or movable side of the chamber, whereby the bale, when compressed, may be tied and discharged; but if I chose to dispense with this means for discharge, I could mount the screw-feeder in a hinged or swinging top, M, as shown in Fig. 1, and by throwing this back allow the bale to be thrown out by the spring-follower.

The operation of my press is as follows: The material is fed in through apertures *d*, and the feeder being revolved, it twists and feeds it down into the chamber against the spring-follower, which is held continuously against it. As more material is screwed in by the compressor, the follower recedes, and naturally its pressure increases as the bale increases until the bale is well packed and is ready for discharge through the side or top, as hereinbefore mentioned.

Having thus described my invention, what I claim as new, and desire to secure by Letters Patent, is—

1. In a baling-press, a chamber having a spring-follower within it, in combination with a screw feeder and compressor opposing said follower, and means for rotating it, substantially as herein described.

2. In a baling-press, the cylindrical chamber A, closed at one end, in combination with the feeder and compressor D, mounted in its other end, said feeder consisting of one section of screw with a double or multiplex thread, each of semi-circumference on opposite sides of the stem, whereby apertures *d* are formed, substantially as herein described.

3. In a baling-press, the cylindrical chamber A, the follower B, and spring C within it, in combination with the screw feeder and compressor D, mounted in said chamber, and means for rotating it, substantially as herein described.

4. In a baling-press, the chamber A, having a flange, *n*, at its top, in combination with the double-threaded screw feeder and compressor D, the threads of which have grooves $m$ in their edges, in which the flange $n$ fits, substantially as herein described.

5. In a baling-press, the cylindrical chamber A and the spring-follower B, in combination with the hinged cover M and the screw feeder or compressor D, mounted therein, and means for rotating it, substantially as herein described.

In witness whereof I have hereunto set my hand.

JOHN D. PAGE.

Witnesses:
E. R. KINNEY,
JOSIE L. KINNEY.